United States Patent [19]

LaRosa et al.

[11] Patent Number: 5,259,005
[45] Date of Patent: Nov. 2, 1993

[54] APPARATUS FOR AND METHOD OF SYNCHRONIZING A CLOCK SIGNAL

[75] Inventors: Christopher P. LaRosa, Lake Zurich; Michael J. Carney, Palatine; James C. Baker, Hanover Park, all of Ill.

[73] Assignee: Motorola, Inc., Schaumburg, Ill.

[21] Appl. No.: 858,246

[22] Filed: Mar. 26, 1992

[51] Int. Cl.$^5$ .............................................. H04L 7/00
[52] U.S. Cl. ....................... 375/106; 375/111
[58] Field of Search ............... 375/111, 118, 106, 119, 375/120, 85, 86

[56] References Cited

U.S. PATENT DOCUMENTS

| | | | |
|---|---|---|---|
| 4,584,695 | 4/1986 | Wong et al. | 375/120 |
| 4,667,333 | 5/1987 | Butcher . | |
| 4,686,689 | 8/1987 | Rorden | 375/85 |
| 4,715,050 | 12/1987 | Tanaka et al. | 375/111 |
| 4,821,297 | 4/1989 | Bergmann et al. | 375/120 |
| 4,953,185 | 8/1990 | Goode . | |

Primary Examiner—Curtis Kuntz
Assistant Examiner—Hai H. Phan
Attorney, Agent, or Firm—Kirk W. Dailey; Rolland R. Hackbart

[57] ABSTRACT

The method of synchronizing a sampling clock signal to a received data signal, the clock recovery circuit generates several clock signals at the symbol rate, with each clock signal having a unique phase. To permit fast initial acquisition, the set of clock signals includes a pair of clocks which differ in phase by one-half of a symbol interval. Additionally, the clock recovery circuitry generates error signals representing the difference between the phase of the received data signal and the phase of each clock signal. The error signals are processed over multiple symbol times to determine the optimal sampling phase. The clock recovery circuit then adjusts or maintains the phase of the symbol clock to provide the optimal sampling phase.

28 Claims, 3 Drawing Sheets

APPARATUS FOR AND METHOD OF SYNCHRONIZING A CLOCK SIGNAL

FIELD OF THE INVENTION

This invention generally relates to radiotelephone communication systems and more specifically to an apparatus for and a method of synchronizing a sampling clock signal to a received data signal for use in a radiotelephone communications system.

BACKGROUND OF THE INVENTION

Recently in the field of radio frequency (RF) communications, there has been an increased demand for digitally encrypted voice and high speed data communications. Since the RF spectrum is inherently limited, one must devise a new system concept and organizational features to accommodate the increased demand. A time division multiple access (TDMA) system is one such system which offers more efficient spectrum utilization and increased capacity.

In its simplest form, a TDMA system is comprised of a transmitting base station capable of time multiplexing messages from at least two users on a single RF channel, and one or more remote receiving stations capable of receiving at least one of the time multiplexed messages. Typically, the receiving station would be a mobile or portable radiotelephone capable of transmitting a TDMA message to the base station on a second RF channel.

In a TDMA system, like most digital communications systems, it is necessary to establish a reference clock in the receiving station that is continuously synchronized with the transmit clock in order to accurately recover the digital data transmitted between the two points. Continuous bit synchronization, as used herein, means that the frequency and phase of the received clock signal must accurately track that of the transmit clock.

Bit synchronization over a mobile communications channel can be difficult to maintain, primarily due to multipath fading. In addition to tracking the drift between the mobile and base station clocks, the clock recovery mechanism must be sufficiently tolerant of noise such that it does not readily lose synchronization during the periods of degraded signal-to-noise ratio caused by fading. Hence, an ideal TDMA mobile clock recovery circuit would have fast initial acquisition of symbol synchronization and continuously maintain synchronization with the base site clock, even during periods of severe signal fading.

One clock recovery technique which has been developed includes an early/late phase adjustment circuit with dual loop bandwidths. For acquisition of the clock from the received data signal, the system utilizes a control loop with a predetermined acquisition bandwidth. The acquisition bandwidth is wide, allowing for fast acquisition of symbol timing from the received data signal. However, the wide acquisition bandwidth results in significant steady-state timing jitter. Therefore, a tighter tracking bandwidth is used for improved steady-state performance. This dual bandwidth approach is relatively complex to implement, requiring acquisition-state and steady-state indicators, as well as a switchable loop bandwidth. In addition to increased implementation complexity, a conventional early/late approach with dual bandwidths has several performance problems associated with it. First, initial acquisition can be delayed considerably due to a false lock indication caused by random noise or interference. Second, if synchronization is lost due to a fade or signal dropout, reacquisition can be quite slow if the circuit does not detect the loss of lock. Finally, having only early and late phase adjustments inherently limits the speed of initial acquisition even if there are no other problems.

Therefore, a need exists for a clock recovery apparatus with a simple implementation and fast acquisition of symbol timing.

SUMMARY OF THE INVENTION

The present invention encompasses a method of synchronizing a sampling clock signal to a phase demodulated signal. The clock recovery method generates several clock signals. Each clock signal has a unique phase. To permit fast initial acquisition, two of the clock signals differ in phase by one-half of a symbol interval. The phase of the phase demodulated signal is compared to the phase of each of the generated clock signals. Next, error signals representing the difference between the phase of the phase demodulated data signal and the phase of each clock signal are generated. The sampling clock signal is generated having the optimal phase as determined by the error signals.

DESCRIPTION OF A PREFERRED EMBODIMENT

The preferred embodiment encompasses a digital receiver of a radiotelephone. The digital receiver includes decision-directed clock recovery circuitry for use in demodulating a received signal. The clock recovery circuitry can shift the phase of the sampling clock by three different increments including a one-half symbol adjustment. This feature provides fast acquisition of the correct sampling phase and adequate steady-state performance without the complexity of the conventional dual bandwidth approaches. Moreover, this technique is easily implemented in either a digital signal processor (DSP) or digital logic circuitry.

Figure 1:
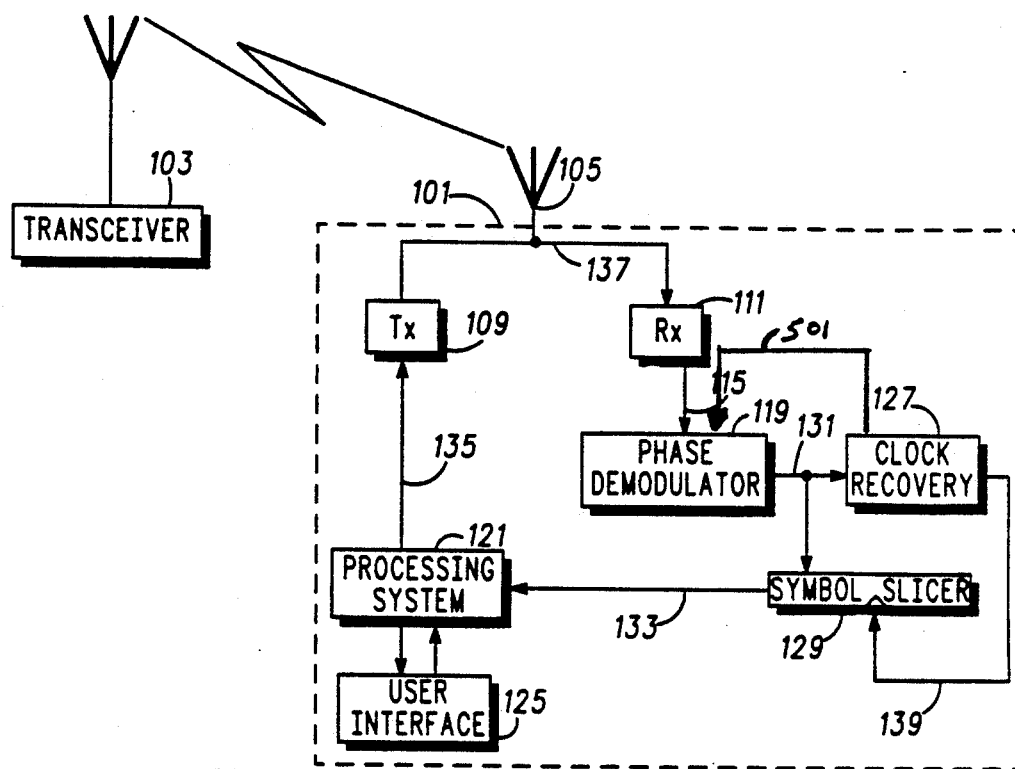
FIG. 1 is a block diagram of the radiotelephone communications system in accordance with the present invention.

FIG. 1 is a block diagram of a radiotelephone system which employs the present invention. In the radiotelephone system, the fixed site transceiver 103 sends and receives radio frequency (RF) signals to and from mobile and portable radiotelephones contained within a fixed geographic area. The radiotelephone 101 is one such radiotelephone served by the fixed site transceiver 103.

While receiving signals from the fixed site transceiver 103, the radiotelephone 101 uses the antenna 105 to couple the RF signal and to convert the RF signal into an electrical radio frequency signal 137. The electrical RF signal is received by the radio receiver 111 for use within the radiotelephone 101. The receiver 111 generates an intermediate frequency (IF) signal 115. This signal 115 is input into the phase demodulator 119. The phase demodulator 119 outputs a phase demodulated signal 131 for use by the clock recovery circuitry 127 and the symbol slicer 129. The clock recovery circuitry 127 outputs the center point clock 139 to a symbol slicer 129. The clock recovery circuitry 127 uses the phase demodulated signal 131 to recover the clock. The phase demodulator signal 131 is also used as the received data signal for the symbol slicer 129. The symbol slicer in turn outputs a symbol signal 133 for use by the processor 121. The processor 121 formats the symbol signal 133 into voice and/or data for the user interface 125. The user interface 125 contains a microphone, a speaker and a keypad.

Upon transmission of RF signals from the portable radiotelephone 101 to the fixed site transceiver 103, the voice and/or data signals from the user interface 125 are processed by the processor 121. The processed signals are input into the transmitter 109. The transmitter 109 converts the processed signals into electrical RF signals. The electrical RF signals are converted into RF signals and output by the antenna 105. The RF signals are received by the fixed site transceiver 103, which interfaces to the land-line telephone signals.

Figure 2:
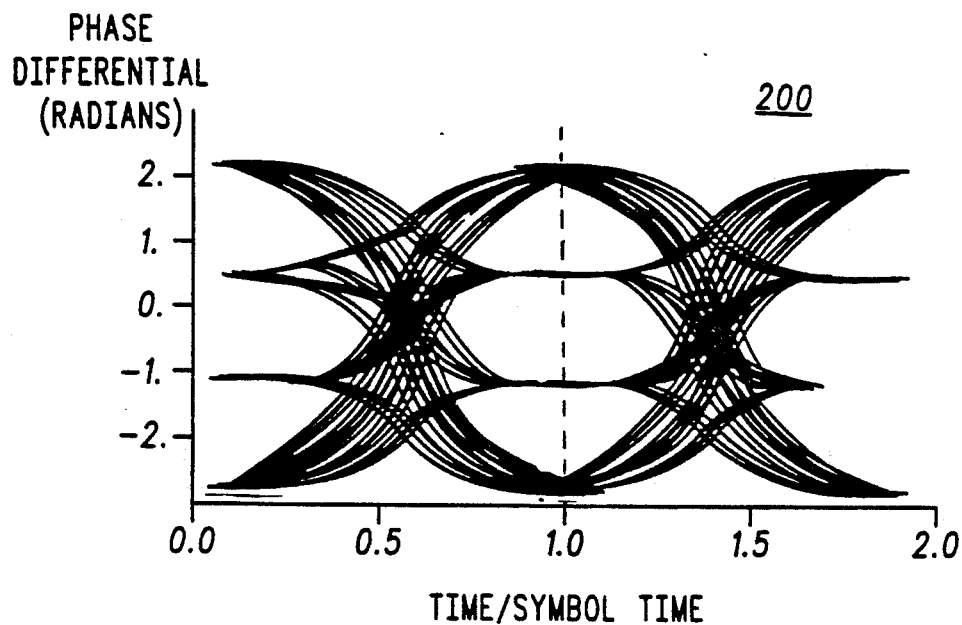
FIG. 2 is an eye diagram of $\pi/4$ QPSK data at the output of a differential detector.

FIG. 2 is an illustration of an eye diagram of a $\pi/4$ quadrature phase shift keying (QPSK) signal at the output of a differential detector. This signal is representative of the data output on the phase demodulated signal 131. For accurate recovery of the symbols transmitted between the transceiver 103 and the portable radiotelephone 101, the sampling clock 139 should sample the received data signal 131 at or near the optimal sampling point as illustrated in FIG. 2. Sampling at points other than the optimal location can cause degraded bit error rate (BER) performance.

Figure 3:
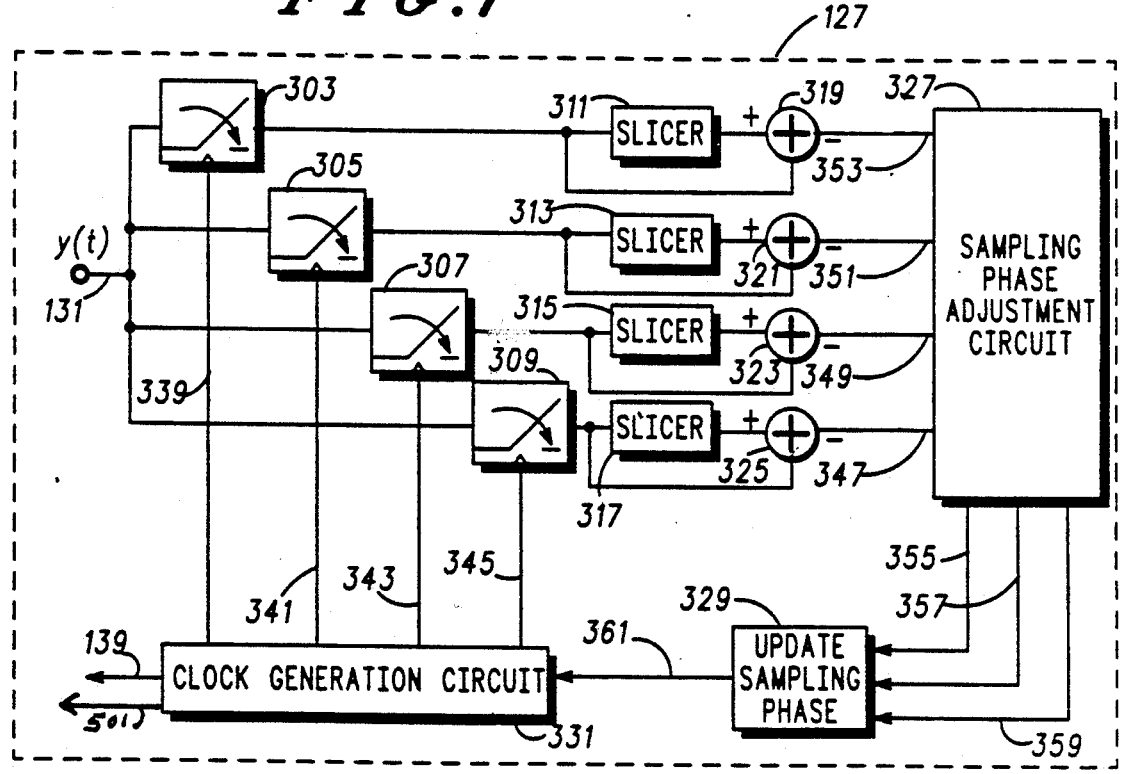
FIG. 3 is a block diagram of clock recovery circuitry in accordance with the present invention.

FIG. 3 is a detailed block diagram of the clock recovery circuitry 127 utilized in the preferred embodiment. The clock recovery circuitry uses the phase demodulator output signal y(t) 131 to recover the clock signals. In the preferred embodiment, the clock generation circuit 331 generates four individual clock signals 339, 341, 343, 345. These clocks are used to sample and hold the phase demodulator output signal y(t) 131.

Other equally sufficient implementations of the present invention may generate two or more clock signals to perform the phase adjustments according to the present invention.

Figure 4:
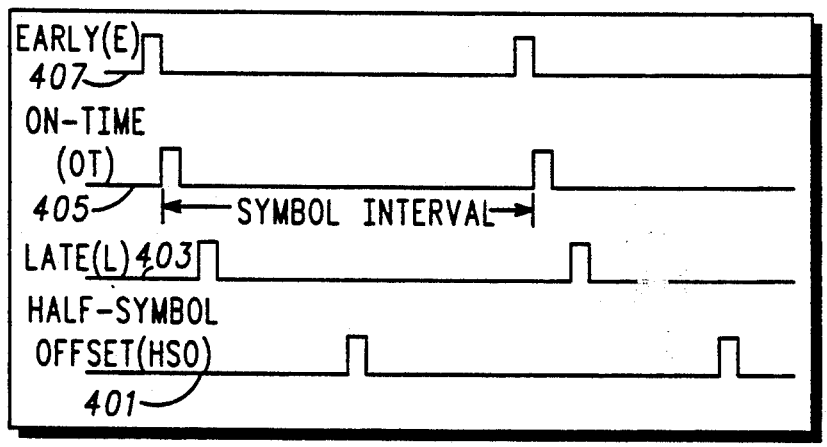
FIG. 4 is a diagram illustrating multiple phase offset clocks used in the present invention.

In the preferred embodiment, the relative phases of the four clock signals are shown in FIG. 4. The on-time signal 405 has a clock pulse once each symbol interval. The early clock signal 407 generates a clock pulse at intervals equal to the intervals of the on-time signal 405, but shifted in phase by $\frac{1}{8}$ of a symbol time before the on-time signal 405. The late clock signal 403 is equal in frequency and shifted by $\frac{1}{8}$ of a symbol interval later than the on-time signal 405. The half symbol offset clock signal 401 is identical to the on-time signal in frequency and shifted by $\frac{1}{2}$ a symbol interval. Other equally sufficient implementations may be used by varying the phase offsets but are still considered within the essence of the invention disclosed herein.

These clock signals are used to sample the phase demodulator output signal 131 with the sample and hold circuits 303, 305, 307, 309. These sampled signals are then input into the slicer and adder combinations to form error signals 347, 349, 351, 353. The error signal is formed by taking the difference between the sampled detector output signal and the nearest corresponding decision point, i.e., the slicer output.

The error signals 347, 349, 351, 353, are input into the sampling phase adjustment circuitry 327. The sampling phase adjustment circuit 327 is used to advance or retard the four symbol clocks to minimize the error at the on-time sampling point. If the error signals indicate that a change in the sampling phase is required, then the sampling phase adjustment circuit 327 will output one of the three possible clock adjustment commands: "move early", "move late", or "move half symbol". A move early command will advance all four symbol clocks 339, 341, 343, 345 by $\frac{1}{8}$ of a symbol time. A move late command will retard all four symbol clocks by $\frac{1}{8}$ of a symbol time. Similarly, the move half symbol command will shift all four symbol clocks by $\frac{1}{2}$ of a symbol time. The clock generation circuit 331 also outputs an additional on-time clock referred to as the sampling clock signal 139, which is used by the symbol slicer 129 of FIG. 1.

Four individual slicers are shown in FIG. 3 for ease of illustration. An equally sufficient embodiment may combine the symbol slicer 129 and the on-time symbol slicer 313, thereby reducing the circuitry necessary for clock recovery.

Figure 5:
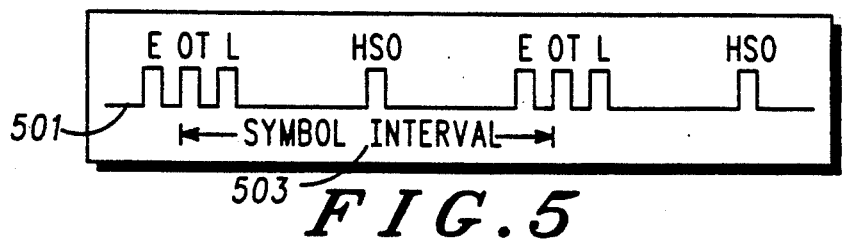
FIG. 5 is an example of a non-uniform sampling clock combining the individual clocks of FIG. 4 in accordance with the present invention.

The non-uniform sampling clock 501 of FIG. 5 is used to sample the phase within the phase demodulator 119. It is formed by ORing the four individual clocks 401, 403, 405, and 407.

Conventional decision-directed clock recovery techniques permit clock adjustments based on derived error information. A typical approach, for example, would permit early and late clock adjustments of $\pm\frac{1}{8}$ of a symbol interval. This approach would provide $\pm 1/16$ of a symbol time resolution, which is adequate for most digital modulation systems. For large initial time errors, however, this conventional approach would generally provide very slow acquisition. This slow acquisition performance has two fundamental contributors: (1) since only early and late clock adjustments are permitted, up to four $\frac{1}{8}$ symbol adjustments would be required to correct for the initial time offset; and (2) there is a quasi-stable false-lock state at the one-half symbol offset point, which could lengthen the acquisition time considerably whenever there is an initial timing error of about one-half symbol.

The invention described herein solves both of these problems associated with a conventional early/late clock recovery approach by permitting clock adjustments of one-half symbol in addition to the early and late adjustments. This is implemented by using the on-time, early, late, and half-symbol offset clocks denoted by signals 405, 407, 403, and 401, respectively, within the clock recovery circuit illustrated in FIG. 3.

The acquisition performance of the proposed clock recovery scheme disclosed herein has been simulated and compared to a more conventional early/late approach for a $\pi/4$ QPSK system with limiter-discriminator based detection. The conventional approach makes ½ symbol early and late clock adjustments based on derived error information. To ensure an unbiased comparison, the loop bandwidths of the two approaches were selected to yield the same-steady state timing jitter.

Figure 6:
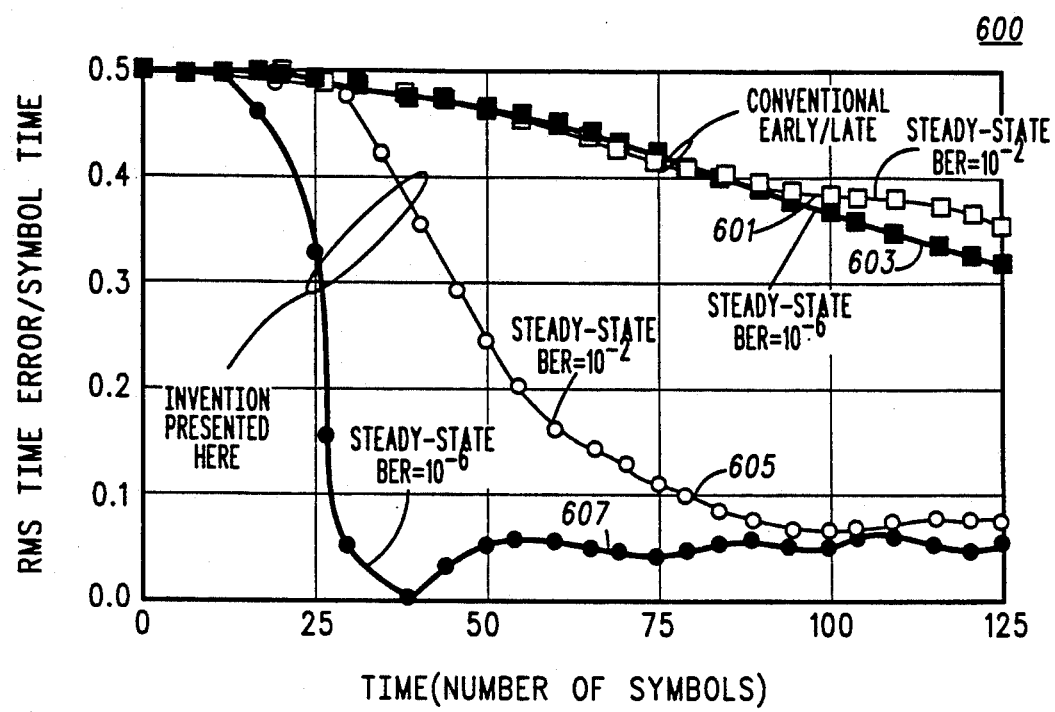
FIG. 6 is a graph representing the acquisition performance of the clock recovery scheme with an initial one-half symbol offset, in accordance with the present invention.
Figure 7:
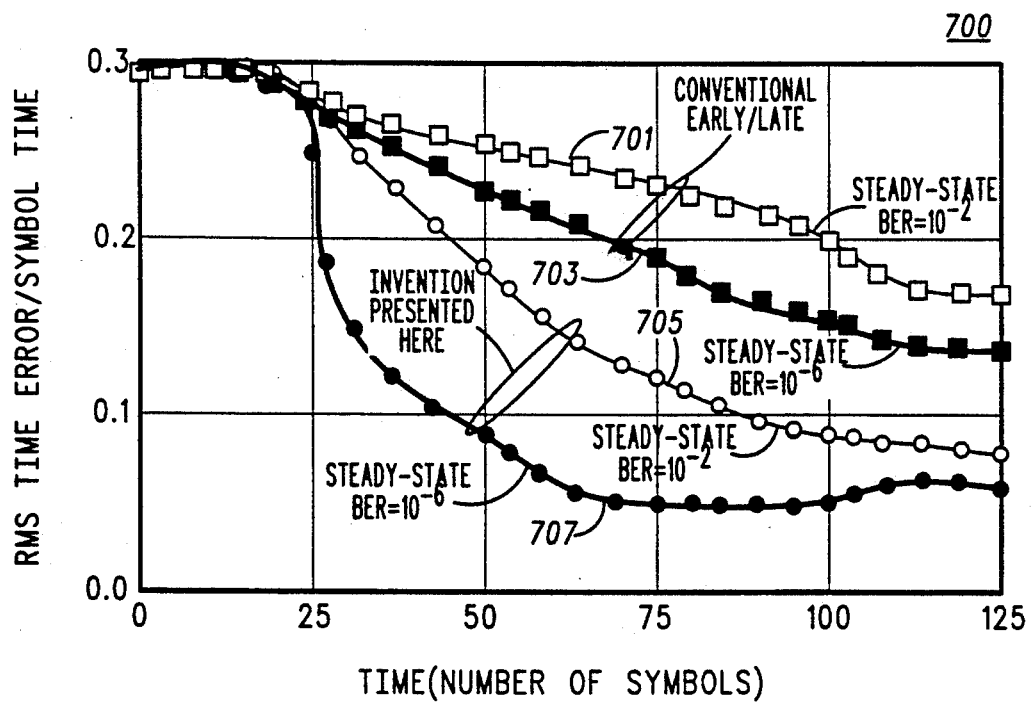
FIG. 7 is a graph representing the acquisition performance of the clock recovery scheme with a uniformly distributed initial offset, in accordance with the present invention.

Acquisition performance has been quantified by measuring the root-mean-squared (RMS) clock error versus time for a static channel at signal-to-noise ratios yielding steady-state bit error rates (BER) of $10^{-2}$ and $10^{-6}$. FIG. 6 illustrates these results. Graphs 601 and 603 represent the conventional early/late method at steady-state bit error rates of $10^{-2}$ and $10^{-6}$, respectively. Graphs 605 and 607 represent the present invention at steady-state BERs of $10^{-2}$ and $10^{-6}$, respectively. FIG. 6 represents results of an initial time error of ½ symbol (worst-case). As the results clearly indicate, the invention presented here offers a significant performance improvement over the early/late technique. FIG. 7 repeats the results of FIG. 6 for a uniformly distributed initial time error. Graphs 701 and 703 correspond to the conventional early/late technique, and graphs 705 and 707 represent the present invention. Again, these results indicate a significant improvement.

What is claimed is:

1. A method of synchronizing a sampling clock signal having a period equal to a symbol interval to a phase demodulated data signal, the sampling clock signal and the phase demodulated data signal having a phase, the method comprising:
   a first step of generating at least first and second clock signals having a period, said first and said second clock signals differing in phase by an amount equal to one-half of the symbol interval;
   a step of comparing the phases of said at least first and second clock signals to the phase of the phase demodulated data signal;
   a comparing creating, responsive to said comparing, at least two error signals representing the difference between the phase of the phase demodulated data signal and the phases of said at least first and second clock signals; and
   a second step of generating the sampling clock responsive to said at least two error signals.

2. A method of synchronizing in accordance with claim 1 wherein said second step of generating the sampling clock further comprises a step of shifting the phase of the sampling clock responsive to said at least two error signals.

3. A method of synchronizing in accordance with claim 1 wherein said first step of generating further comprises a step of generating a third clock signal which differs in phase from said first clock signal by a first predetermined symbol interval fraction, wherein said first predetermined symbol interval fraction is less than one-half of the symbol interval.

4. A method of synchronizing in accordance with claim 3 wherein said first predetermined symbol interval fraction is equal to one-eight of the symbol interval.

5. A method of synchronizing in accordance with claim 3 wherein said third clock signal lags said first clock signal by said first predetermined symbol interval fraction.

6. A method of synchronizing in accordance with claim 3 wherein said third clock signal leads said first clock signal by said first predetermined symbol interval fraction.

7. A method of synchronizing in accordance with claim 5 wherein said first step of generating further comprises a step of generating a fourth clock signal which differs in phase from said first clock signal by a second predetermined symbol interval fraction.

8. A method of synchronizing in accordance with claim 7 wherein said fourth clock signal leads said first clock signal by said second predetermined symbol interval fraction.

9. A method of synchronizing in accordance with claim 8 wherein said second predetermined symbol interval fraction is equal to one-eighth of the symbol interval.

10. A sampling clock synchronizing apparatus for synchronizing a sampling clock to a data signal, the data signal and the sampling clock having a phase, the apparatus comprising:
    first means for generating at least first and second clock signals, said first and second clock signals differing in phase by an amount equal to one-half of a symbol interval;
    means for comparing the phases of said at least first and second clock signals to the phase of the data signal;
    means for creating, responsive to said means for comparing, at least two error signals representing the difference between the phase of the data signal and the phases of said at least first and second clock signals; and
    second means for generating the sampling clock responsive to said at least two error signals.

11. A sampling clock synchronizing apparatus in accordance with claim 10 wherein said second means for generating the sampling clock further comprises means for shifting the phase of the sampling clock responsive to said at least two error signals.

12. A sampling clock synchronizing apparatus in accordance with claim 10 wherein said first means for means for generating further comprises generating a third clock signal which differs in phase from said first clock signal by a first predetermined symbol interval fraction, wherein said first predetermined symbol interval fraction is less than one-half of the symbol interval.

13. A sampling clock synchronizing apparatus in accordance with claim 12 wherein said first predetermined symbol interval fraction is equal to one-eight of the symbol interval.

14. A sampling clock synchronizing apparatus in accordance with claim 12 wherein said third clock signal lags said first clock signal by said first predetermined symbol interval fraction.

15. A sampling clock synchronizing apparatus in accordance with claim 12 wherein said third clock signal leads said first clock signal by said first predetermined symbol interval fraction.

16. A sampling clock synchronizing apparatus in accordance with claim 14 wherein said first means for generating further comprises means for generating a fourth clock signal which differs in phase from said first clock signal by a second predetermined symbol interval fraction.

17. A sampling clock synchronizing apparatus in accordance with claim 16 wherein said fourth clock signal leads said first clock signal by said second predetermined symbol interval fraction.

18. A sampling clock synchronizing apparatus in accordance with claim 17 wherein said second predetermined symbol interval fraction is equal to one-eighth.

19. A radiotelephone including at least a receiver, a phase demodulator, and a symbol slicer, the receiver receiving at least a first input signal, the first input signal having a phase, the radiotelephone comprising:

means for demodulating the phase of the first input signal and forming a phase demodulated signal having a phase;

means for generating at least first and second clock signals, said first and second clock signals differing in phase by an amount equal to one-half of symbol interval;

means for comparing the phases of said at least first and second clock signals to the phase of the phase demodulated signal;

means for creating, responsive to said means for comparing, at least two error signals representing the difference between the phase of the phase demodulated signal and the phases of said at least first and second clock signals;

means for generating a sampling clock responsive to said at least two error signals; and means for sampling the phase demodulated signal with said sampling clock within the symbol slicer.

20. A method of synchronizing a sampling clock signal to a phase demodulated data signal, the sampling clock signal and the phase demodulated data signal having a phase, the method comprising:

a first step of generating at least first and second clock signals, said first and said second clock signals differing in phase by an amount equal to 180 degrees;

a step of comparing the phases of said at least first and second clock signals to the phase of the phase demodulated data signal;

a step of creating, responsive to said comparing step of, at least two error signals representing the difference between the phase of the phase demodulated data signal and the phase of said at least first and said second clock signals; and a second step of generating the sampling clock responsive to said at least two error signals.

21. A method of synchronizing a sampling clock signal having a period equal to a symbol interval to a phase demodulated data signal, the sampling clock signal and the phase demodulated data signal having a phase, the method comprising:

a first step of generating at least first second and third clock signals having a period, said first and second clock signals differing in phase by an amount equal to one-half of the symbol interval, said third clock signal differing in phase from said first clock signal by a first predetermined symbol interval fraction, wherein said first predetermined symbol interval fraction is less than one-half of the symbol interval;

a step of comparing the phases of said at least first, second and third clock signals to the phase of the phase demodulated data signal;

a step of creating, responsive to said step of comparing, at least three error signals representing the difference between the phase of the phase demodulated data signal and the phases of said at least first, second and third clock signals; and a second step of generating the sampling clock responsive to said at least three error signals.

22. A method of synchronizing in accordance with claim 21 wherein said first predetermined symbol interval fraction is equal to one-eighth of the symbol interval.

23. A method of synchronizing in accordance with claim 21 wherein said third clock signal lags said first clock signal by said first predetermined symbol interval fraction.

24. A method of synchronizing in accordance with claim 21 wherein said third clock signal leads said first clock signal by said first predetermined symbol interval fraction.

25. A method of synchronizing in accordance with claim 23 wherein said first step of generating further comprises generating a fourth clock signal which differs in phase from said first clock signal by a second predetermined symbol interval fraction.

26. A method of synchronizing in accordance with claim 25 wherein said fourth clock signal leads said first clock signal by said second predetermined symbol interval fraction.

27. A method of synchronizing in accordance with claim 26 wherein said second predetermined symbol interval fraction is equal to one-eighth.

28. A sampling clock synchronizing apparatus for synchronizing a sampling clock to a data signal, the data signal and the sampling clock having a phase, the apparatus comprising:

first means for generating at least first, second and third clock signals, said first and second clock signals differing in phase by an amount equal to one-half of a symbol interval, said third clock signal differing in phase from said first clock signal by a first predetermined symbol interval fraction, wherein said first predetermined symbol interval fraction is less than one-half of the symbol interval;

means for comparing the phases of said at least first, second and third clock signals to the phase of the data signal;

means for creating, responsive to said means for comparing, at least three error signals representing the difference between the phase of the data signal and the phases of said at least first, second and third clock signals; and second means for generating the sampling clock responsive to said at least three error signals.

* * * * *

UNITED STATES PATENT AND TRADEMARK OFFICE
CERTIFICATE OF CORRECTION

PATENT NO. : 5,259,005

DATED : November 2, 1993

INVENTOR(S) : Christopher P. LaRosa, Michael J. Carney and James C. Baker

It is certified that error appears in the above-identified patent and that said Letters Patent is hereby corrected as shown below:

In column 5, line 37, please delete the word "comparing" first occurrence and replace with --step of--; and before "comparing" (second occurrence) insert --step of--.

Signed and Sealed this

Second Day of August, 1994

*Attest:*

BRUCE LEHMAN

*Attesting Officer*  Commissioner of Patents and Trademarks